US012771441B2

(12) United States Patent
Singh et al.

(10) Patent No.: US 12,771,441 B2
(45) Date of Patent: Oct. 20, 2026

(54) DEPLOYMENT OF A WEARABLE METASURFACE WITH A SEGMENTED GROUND PLANE

(71) Applicant: Dell Products L.P., Round Rock, TX (US)

(72) Inventors: Tejinder Singh, Manotick (CA); Kan Wang, Ottawa (CA); Navjot Kaur Khaira, Manotick (CA)

(73) Assignee: Dell Products L.P., Round Rock, TX (US)

( * ) Notice: Subject to any disclaimer, the term of this patent is extended or adjusted under 35 U.S.C. 154(b) by 276 days.

(21) Appl. No.: 18/780,263

(22) Filed: Jul. 22, 2024

(65) Prior Publication Data

US 2026/0025200 A1 Jan. 22, 2026

(51) Int. Cl.
*H04B 7/26* (2006.01)
*H04B 1/3827* (2015.01)

(52) U.S. Cl.
CPC ............... *H04B 7/26* (2013.01); *H04B 1/385* (2013.01); *H04B 2001/3861* (2013.01)

(58) Field of Classification Search
CPC .... H04B 7/04013; H04B 7/0413; H04B 7/06; H04B 7/0617; H04B 1/385; H04B 17/318;
(Continued)

(56) References Cited

U.S. PATENT DOCUMENTS

| | | |
|---|---|---|
| 2,648,839 A | 8/1953 | Ford et al. |
| 2,894,261 A | 7/1959 | Yaru |

(Continued)

FOREIGN PATENT DOCUMENTS

| | | |
|---|---|---|
| CN | 114168014 A | 3/2022 |
| CN | 117044035 A | 11/2023 |
| EP | 2 495 621 A1 | 9/2012 |

OTHER PUBLICATIONS

"Introducing the New Oura Ring Generation 3" Oura. [https://ouraring.com/blog/oura-generation2-vs-generation3/], retrieved Jul. 3, 2025, 3 pages.

(Continued)

*Primary Examiner* — Ajibola A Akinyemi
(74) *Attorney, Agent, or Firm* — Amin, Turocy & Watson, LLP

(57) ABSTRACT

The technology described herein is directed towards designing and deploying a wearable device that includes a passive metasurface of unit cells with a segmented ground plane of electrically separated segments. When the wearable device is worn, e.g., as a ring or wristband that contacts the wearer's skin, the wearer's skin conductivity electrically connects the separated segments to provide a ground plane. With a complete ground plane, the metasurface's unit cells resonate when exposed to a transmitted signal and reflect a distinct signature corresponding to a physical radiation pattern of signals reflected by the activated metasurface. When not worn, the metasurface is deactivated because of the electrically disconnected ground plane segments. Discontinuity parameters of size, position, and quantity of ground discontinuities are iteratively varied during modeling of a metasurface to determine the design with the largest difference in performance characteristics for when the device is worn versus not worn.

20 Claims, 14 Drawing Sheets

(58) Field of Classification Search
CPC .......... H04B 2001/3861; H04B 7/0626; H04B 7/0695; H04B 7/088; H04B 7/15514; H04B 7/15528; H04B 7/02
USPC ........................................................ 455/41.2
See application file for complete search history.

(56) References Cited

U.S. PATENT DOCUMENTS

| | | | |
|---|---|---|---|
| 2,981,949 | A | 4/1961 | Elliott |
| 3,218,644 | A | 11/1965 | Berry |
| 3,308,467 | A | 3/1967 | Morrison, Jr. |
| 4,518,967 | A | 5/1985 | Westerman |
| 5,579,019 | A | 11/1996 | Uematsu et al. |
| 10,038,690 | B2 | 7/2018 | Andrews et al. |
| 10,193,880 | B1 | 1/2019 | Jiang et al. |
| 10,497,227 | B2 | 12/2019 | Bilal et al. |
| 10,701,067 | B1 | 6/2020 | Ziraknejad et al. |
| 11,042,613 | B2 | 6/2021 | Deole et al. |
| 11,074,488 | B2 | 7/2021 | Klimt |
| 11,340,392 | B1 | 5/2022 | Wollack et al. |
| 11,393,037 | B1 | 7/2022 | Fields et al. |
| 11,461,687 | B1 * | 10/2022 | Shaikh .................. G06F 16/212 |
| 11,757,165 | B2 | 9/2023 | Shi |
| 11,949,673 | B1 | 4/2024 | Sanchez |
| 12,225,026 | B1 | 2/2025 | Zhou et al. |
| 12,260,077 | B1 | 3/2025 | V et al. |
| 12,407,681 | B2 | 9/2025 | Young et al. |
| 2001/0017603 | A1 | 8/2001 | Teshirogi et al. |
| 2003/0098815 | A1 | 5/2003 | Teshirogi et al. |
| 2005/0038994 | A1 | 2/2005 | Johnson et al. |
| 2006/0097942 | A1 | 5/2006 | Tanaka et al. |
| 2007/0091004 | A1 | 4/2007 | Puuri |
| 2011/0209372 | A1 | 9/2011 | Padgett et al. |
| 2012/0056776 | A1 | 3/2012 | Shijo et al. |
| 2012/0306711 | A1 | 12/2012 | Asplund et al. |
| 2015/0035643 | A1 | 2/2015 | Kursun |
| 2015/0109106 | A1 | 4/2015 | Gomez et al. |
| 2015/0147065 | A1 | 5/2015 | Civelli et al. |
| 2015/0222023 | A1 | 8/2015 | Shijo et al. |
| 2016/0028715 | A1 | 1/2016 | Sivashanmugam et al. |
| 2016/0254396 | A1 | 9/2016 | Casse |
| 2019/0132399 | A1 | 5/2019 | Henning et al. |
| 2019/0379120 | A1 | 12/2019 | Manasson et al. |
| 2020/0005113 | A1 | 1/2020 | Schnippering |
| 2020/0012912 | A1 | 1/2020 | Klimt |
| 2020/0042977 | A1 | 2/2020 | Boulby |
| 2020/0294642 | A1 * | 9/2020 | Bostic .................... G16H 50/20 |
| 2020/0403647 | A1 | 12/2020 | Bit-Babik et al. |
| 2021/0028528 | A1 | 1/2021 | Alexanian et al. |
| 2021/0258314 | A1 | 8/2021 | Tabaja |
| 2022/0012336 | A1 * | 1/2022 | Lakkundi .............. G06F 21/564 |
| 2022/0078762 | A1 | 3/2022 | Machado et al. |
| 2022/0085841 | A1 | 3/2022 | Grétarsson et al. |
| 2022/0413587 | A1 | 12/2022 | Lagnado et al. |
| 2023/0155812 | A1 | 5/2023 | Bennison |
| 2023/0344136 | A1 | 10/2023 | Liu et al. |
| 2023/0386245 | A1 | 11/2023 | Tada |
| 2024/0214967 | A1 | 6/2024 | Zorgui et al. |
| 2024/0248366 | A1 | 7/2024 | Cho et al. |
| 2024/0250445 | A1 | 7/2024 | Sano |
| 2024/0310561 | A1 | 9/2024 | Allen et al. |
| 2024/0387998 | A1 | 11/2024 | Wong et al. |
| 2024/0393433 | A1 | 11/2024 | Elian et al. |
| 2024/0402342 | A1 | 12/2024 | Knapp et al. |
| 2024/0406752 | A1 | 12/2024 | Coskun et al. |
| 2025/0078593 | A1 | 3/2025 | Beuchat et al. |
| 2025/0309943 | A1 | 10/2025 | Elshafie et al. |
| 2025/0372886 | A1 | 12/2025 | Wada et al. |
| 2026/0025172 | A1 | 1/2026 | Singh et al. |

OTHER PUBLICATIONS

"Galaxy Ring—Galaxy AI is here" Samsung. [https://www.samsung.com/us/rings/galaxy-ring/? msockid=2bb734e76e306246380e20d36f0b63d2], retrieved Jul. 3, 2025, 19 pages.
Singh, et al. "Utilizing Passive Wearable Devices To Capture Device Interaction Data for Supplementary Authentication" U.S. Appl. No. 19/030,562, filed Jan. 17, 2025, 53 pages.
Singh, et al. "Long-Term Pattern Recognition Using Proximity Detection for Security Applications" U.S. Appl. No. 19/056,466, filed Feb. 18, 2025, 49 pages.
Singh, et al. "User Authentication in Computer Devices Through Statistical Analysis of Gesture Data" U.S. Appl. No. 19/170,829, filed Apr. 4, 2025, 40 pages.
Office Action mailed Jun. 3, 2026 for U.S. Appl. No. 19/056,466, 33 pages.
Office Action mailed Dec. 10, 2025 for U.S. Appl. No. 18/775,968, 34 pages.
Notice of Allowance mailed Oct. 21, 2025 for U.S. Appl. No. 18/776,007, 43 pages.
Notice of Allowance mailed Oct. 24, 2025 for U.S. Appl. No. 18/776,018, 40 pages.
Office Action mailed Dec. 10, 2025 for U.S. Appl. No. 18/775,984, 28 pages.
Notice of Allowance mailed Mar. 21, 2025 for U.S. Appl. No. 18/780,245, 25 pages.
Singh, et al. "Passive Wearable Device for Security and Authentication" U.S. Appl. No. 18/775,968, filed Jul. 17, 2024, 39 pages.
Singh, et al. "Scalable and Compact Metasurface Design for Smart and Functional Wearable Devices" U.S. Appl. No. 18/775,979, filed Jul. 17, 2024, 39 pages.
Singh, et al. "Integrated Physical Device Identification for Remote Management of Wearable Metasurfaces" U.S. Appl. No. 18/775,984, filed Jul. 17, 2024, 41 pages.
Singh, et al. "Differentiating Physical Radiation Patterns in Passive Metasurfaces" U.S. Appl. No. 18/775,993, filed Jul. 17, 2024, 40 pages.
Singh, et al. "Customization and Appearance Information for Wearable Metasurfaces" U.S. Appl. No. 18/775,999, filed Jul. 17, 2024, 41 pages.
Singh, et al. "Computer Peripheral With Embedded Transceiver for Proximity Detection of Wearable Metasurfaces" U.S. Appl. No. 18/776,001, filed Jul. 17, 2024, 40 pages.
Singh, et al. "Proximity Based Multifactor Authentication Using Passive Wearable Metasurfaces" U.S. Appl. No. 18/776,007, filed Jul. 17, 2024, 46 pages.
Singh, et al. "Automatic Computing Device Wake up and Lock Using Passive Wearable Metasurface" U.S. Appl. No. 18/776,011, filed Jul. 17, 2024, 45 pages.
Singh, et al. "Software Stack and Backend for Passive Wearable Metasurfaces for Remote Management and Analytics" U.S. Appl. No. 18/776,018, filed Jul. 17, 2024, 50 pages.
Singh, et al. "Activation and Deactivation Detection for a Passive Wearable Metasurface Using a Segmented Ground Plane" U.S. Appl. No. 18/780,245, filed Jul. 22, 2024, 42 pages.
Singh, et al. "Compact Transceiver With Advanced Beam-Scanning Functionality Based On Leaky Wave Antenna" U.S. Appl. No. 18/780,280, filed Jul. 22, 2024, 37 pages.
Singh, et al. "Aperture Reconfiguration for Transceiver With Beam-Scanning Capability" U.S. Appl. No. 18/780,284, filed Jul. 22, 2024, 37 pages.
Non-Final Office Action received for U.S. Appl. No. 18/775,993 dated Jan. 28, 2026, 18 pages.
Non-Final Office Action received for U.S. Appl. No. 18/775,999 dated Mar. 23, 2026, 36 pages.
Non-Final Office Action received for U.S. Appl. No. 18/780,280 dated Mar. 11, 2026, 12 pages.
Notice of Allowance received for U.S. Appl. No. 18/775,968 dated Apr. 7, 2026, 6 pages.
Notice of Allowance received for U.S. Appl. No. 18/775,984 dated Mar. 25, 2026, 6 pages.
Notice of Allowance mailed Jun. 24, 2026 for U.S. Appl. No. 18/775,993, 48 pages.
Office Action mailed Jun. 29, 2026 for U.S. Appl. No. 18/776,011, 68 pages.

(56) References Cited

OTHER PUBLICATIONS

Notice of Allowance mailed Jul. 2, 2026 for U.S. Appl. No. 18/780,280, 85 pages.
Notice of Allowance mailed Jun. 30, 2026 for U.S. Appl. No. 19/030,562, 43 pages.
Notice of Allowance mailed Jun. 30, 2026 for U.S. Appl. No. 19/056,466, 69 pages.
Corrected Notice of Allowability mailed May 6, 2026 for U.S. Appl. No. 18/775,968, 41 pages.
Ohtsuki, T. and Kamai, H., 2016, September. "Biometric authentication using hand movement information from wrist-worn PPG sensors". In 2016 IEEE 27th Annual International Symposium on Personal, Indoor, and Mobile Radio Communications (PIMRC) (pp. 1-5). IEEE. (Year: 2016).
Notice of Allowance mailed Jul. 7, 2026 for U.S. Appl. No. 19/170,829, 86 pages.
Cao, H., Liu, D., Jiang, H., Wang, R., Chen, Z. and Xiong, J., 2023. "LIPAuth: Hand-dependent light intensity patterns for resilient user authentication". ACM Transactions on Sensor Networks, 19(3), pp. 1-29. (Year: 2023).

* cited by examiner

DEPLOYMENT OF A WEARABLE METASURFACE WITH A SEGMENTED GROUND PLANE

BACKGROUND

Existing wearable devices such as rings and wristwatches for activity tracking and/or health monitoring operate by establishing a communication link between the wearable device and a transceiver, generally using BLUETOOTH low energy technology. As such, these devices need electrical components such as a battery, various sensors, circuits, a controller, and antennas within the device, increasing the cost, size, and complexity in design. Moreover, due to the smaller battery size, these wearable devices need to be charged frequently.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1A:
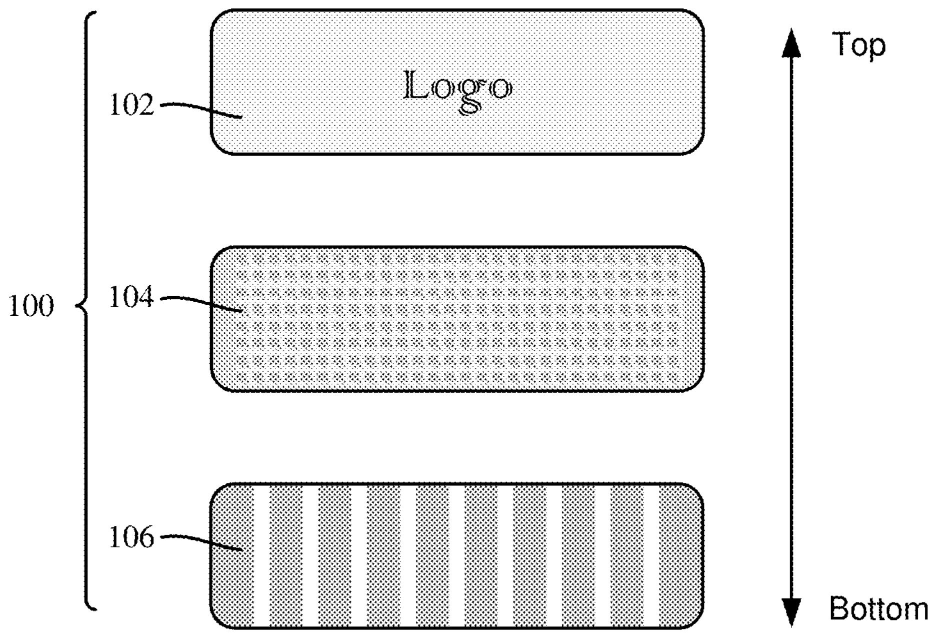
FIG. 1A is a top-down deconstructed representation of an example wearable device in the form of a ring (or similarly a wristband) design with a segmented ground plane, in accordance with various example embodiments and implementations of the subject disclosure.

The technology described herein is generally directed towards designing and deploying a wearable or otherwise portable metasurface that is capable of interacting with a receiver connected to a computing device, such as a personal computer or laptop. The metasurface, which can be passive in that it needs no power, includes unit cells that are distinctly identifiable based on customized physical radiation characteristics relative to other metasurfaces when reflecting a transmitted signal back to a receiver, e.g., of a transceiver that transmits the signal.

As will be understood, the wearable metasurface includes a segmented ground plane of separated segments that results in activation or deactivation depending on whether the separated segments are electrically connected to one another or not connected. Generally, activation results from skin conductivity electrically connecting the separated segments, such that the wearable metasurface is activated when worn by a user, e.g., on a finger as a ring or on a wrist as a wristband, and deactivated when not worn. That is, when worn the skin conductivity of the wearer completes the ground plane so that when a signal is transmitted at the designed operating frequency by a transmitter to the metasurface, the unit cells resonate and thereby reflect the signal, as altered by the metasurface, back to a receiver, which results in the presence of the metasurface being detected. If the user is not wearing the wearable device, there is no ground plane, and no signal is reflected as the unit cells do not resonate, thereby deactivating the device.

However, there are many different ways in which a ground plane can be segmented, each way having difference performance characteristics. The determination of the size, position, and quantity parameters of ground discontinuities is thus informative in determining a suitable design. In general, a design objective is to maximize the difference in electromagnetic (EM) responses between activation (device worn) and deactivation (device not worn) phases, thereby minimizing margin for error. To facilitate the optimization endeavor, an iterative process for determining/refining these parameters is described herein that streamlines the process of honing in on an optimal configuration, ensuring that a final design aligns seamlessly with specified performance criteria.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in RF communications and RF devices in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1A shows the concept of a metasurface 100 with a segmented ground plane. From top down in a deconstructed view, the metasurface 100 includes a mask layer 102 or the like that determines the appearance of the outside of the metasurface 100, a next layer including the unit cells of a metasurface 104 (on a substrate), and a segmented ground plane 106 beneath the substrate. The mask layer 102, e.g., made of a suitable material that is generally transparent to the operating frequency of the metasurface's unit cells, also protects the unit cells from dirt, wear and tear (dings) and the like.

As shown in FIG. 1A, the segmented ground plane 106 is made of separated metallic segments, which are electrically insulated from one another when the device 100 is in a deactivated state. As a result, until the device is worn (or the separated segments are otherwise electrically coupled to one another), the device will not reflect a transmitted signal at the defined operating frequency band. This corresponds to the "OFF" (deactivated) state 110 of the conceptual "switch" shown in FIG. 1B.

Figure 1B:
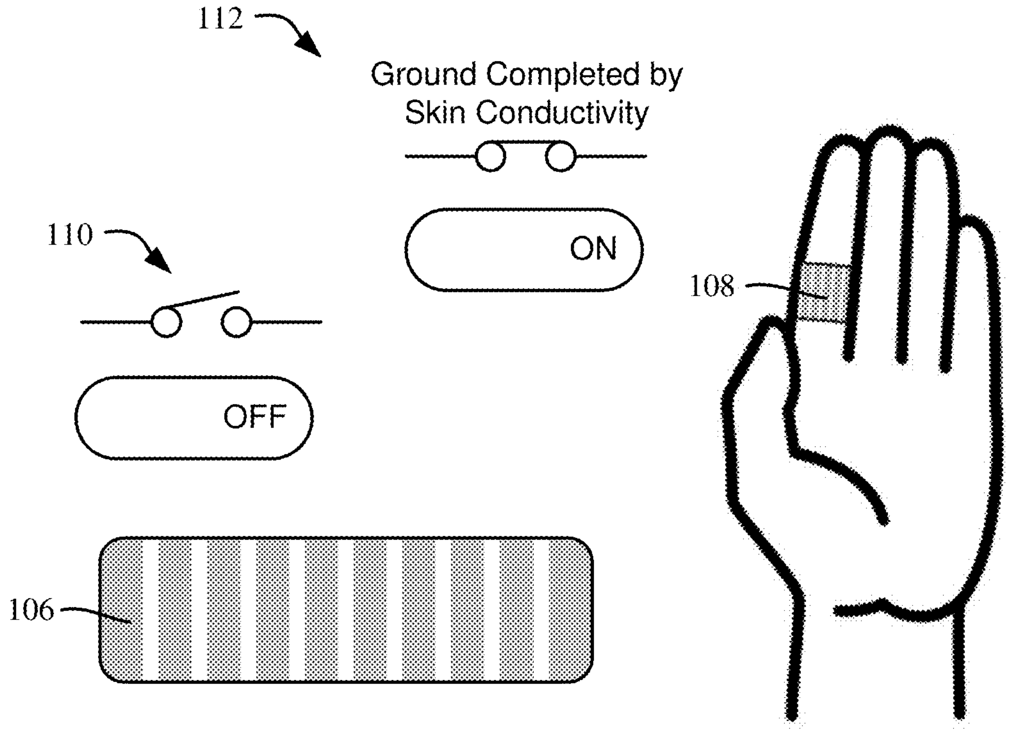
FIG. 1B is a representation of an example wearable device in the form of a ring design highlighting a segmented ground plane (normally not visible when worn), in accordance with various example embodiments and implementations of the subject disclosure.
Figure 9A:
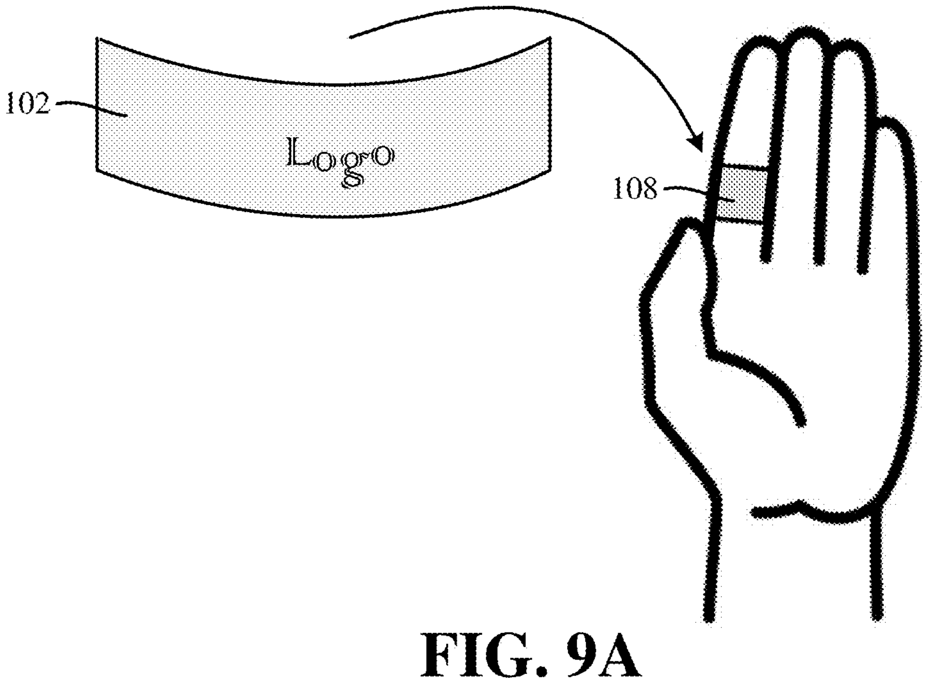
FIG. 9A is a representation of an example wearable device in the form of a ring design in which a mask that covers the metasurface is visible, in accordance with various example embodiments and implementations of the subject disclosure.

FIG. 1B also shows the activated operating concept of the segmented ground plane 106; note that in this example for purposes of explanation the segments of the segmented ground plane are visible (as if inside-out, or as if the metasurface unit cells, substrate and mask were visibly transparent, which is not visibly accurate when the wearable device is properly deployed and worn; (instead, as shown in FIG. 9A the mask 102 is actually visible when worn as a ring 108)). When the wearable device is worn, e.g., as the finger ring 108 in FIG. 1B, the skin conductivity of the user electrically couples the metallic segments together and thereby completes the ground plane. This corresponds to the "ON" (activated) state 112 of the conceptual "switch" shown in FIG. 1B. As a result, when the device 100 is worn, the otherwise separated segments are electrically coupled to one another by the user's skin conductivity, the unit cells will resonate at the operating frequency, and the device will reflect the transmitted signal to the transceiver's receiver.

Figure 2:
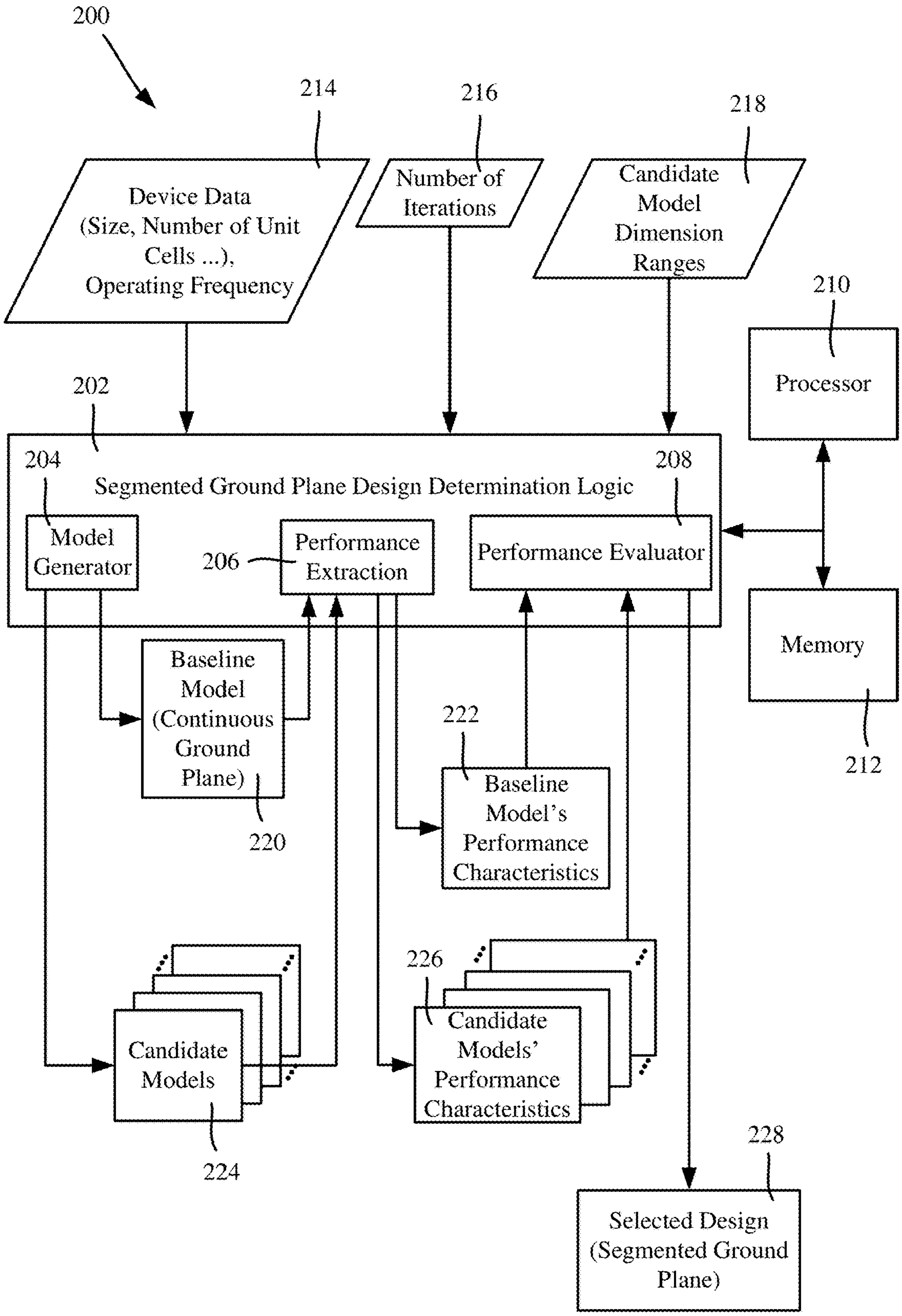
FIG. 2 is a block diagram showing an example system for determining parameters for a metasurface with a segmented ground plane, in accordance with various aspects and implementations of the subject disclosure.

FIG. 2 shows a generalized block diagram of an example system 200 including segmented ground plane design determination logic 202 for designing and implementing a metasurface capable of changing between activation and deactivation phases based on whether the segments of the segmented ground plane are electrically connected to one another, or not connected, respectively, corresponding to whether the metasurface is worn or not worn, respectively. In general, and as described herein, the determination logic 202 can be considered as including a model generator 204, a performance extraction module/component 206, and a performance evaluator module/component 208. The determination logic 202 executes via a processor 210 and memory 212.

The wearable device can be different relative to other devices in its size and in other ways, such as how many unit cells are present given the available area for the metasurface. For example, a wearable metasurface in the form of a ring has a smaller size and typically less unit cells relative to a metasurface in the form of a wearable wristband. Such variable input data is known in advance, along with the desired operating frequency of the signal to be reflected by the metasurface, as shown via device data block 214.

In one implementation, the segmented ground plane design determination logic 202 operates iteratively, and thus one stopping criterion can be the number of iterations (input block 216). Further, the variable parameters to be optimized can have defined ranges (constraints) for the position, size and/or number of ground discontinuities, which are input via block 218. Note that the number of iterations can be determined by the defined ranges along with a delta for each range, e.g., the sizes can be varied from size A to size B with a delta D such that there are a finite number of size values; similarly the positions and number of ground discontinuities can have respective lowest and highest values with respective deltas for each, such that a finite number of combinations exists that can be evaluated. In other words, the stopping criterion can be the number of possible combinations given the range constraints and deltas, which is thus inherently the defined number of iterations.

One model that is generated by the model generator 204, represented by block 220, is a design of a metasurface with a continuous ground plane that establishes the baseline performance characteristics at the designed operating frequency. Performance extraction (block 206) results in the baseline model performance characteristics (block 222), e.g., in the form of $S_{11}$ and/or $S_{21}$ amplitude data over various frequencies around the design frequency.

Other models that are generated by the model generator 204, represented by blocks 224, are designs of candidate metasurfaces, each with discontinuous ground planes with different parameters. Performance extraction (block 206) results in the candidate models' performance characteristics (block 226), e.g., similarly in the form of $S_{11}$ and/or $S_{21}$ amplitude data over various frequencies around the design frequency.

For each candidate metasurface, the performance evaluator 208 extracts the candidate "device not worn" versus the baseline device "worn" difference between the performance characteristics. Thus, the differences of the segregated ground plane designs and the baseline performance characteristics of the model with the continuous ground plane are evaluated. More particularly, the differences in the performance characteristics from the baseline serves as the deciding factor, that is, to select and output the "not worn" candidate design with the maximum performance difference (relative to the other candidate designs) from the "worn" baseline design at the design frequency.

Figure 3:
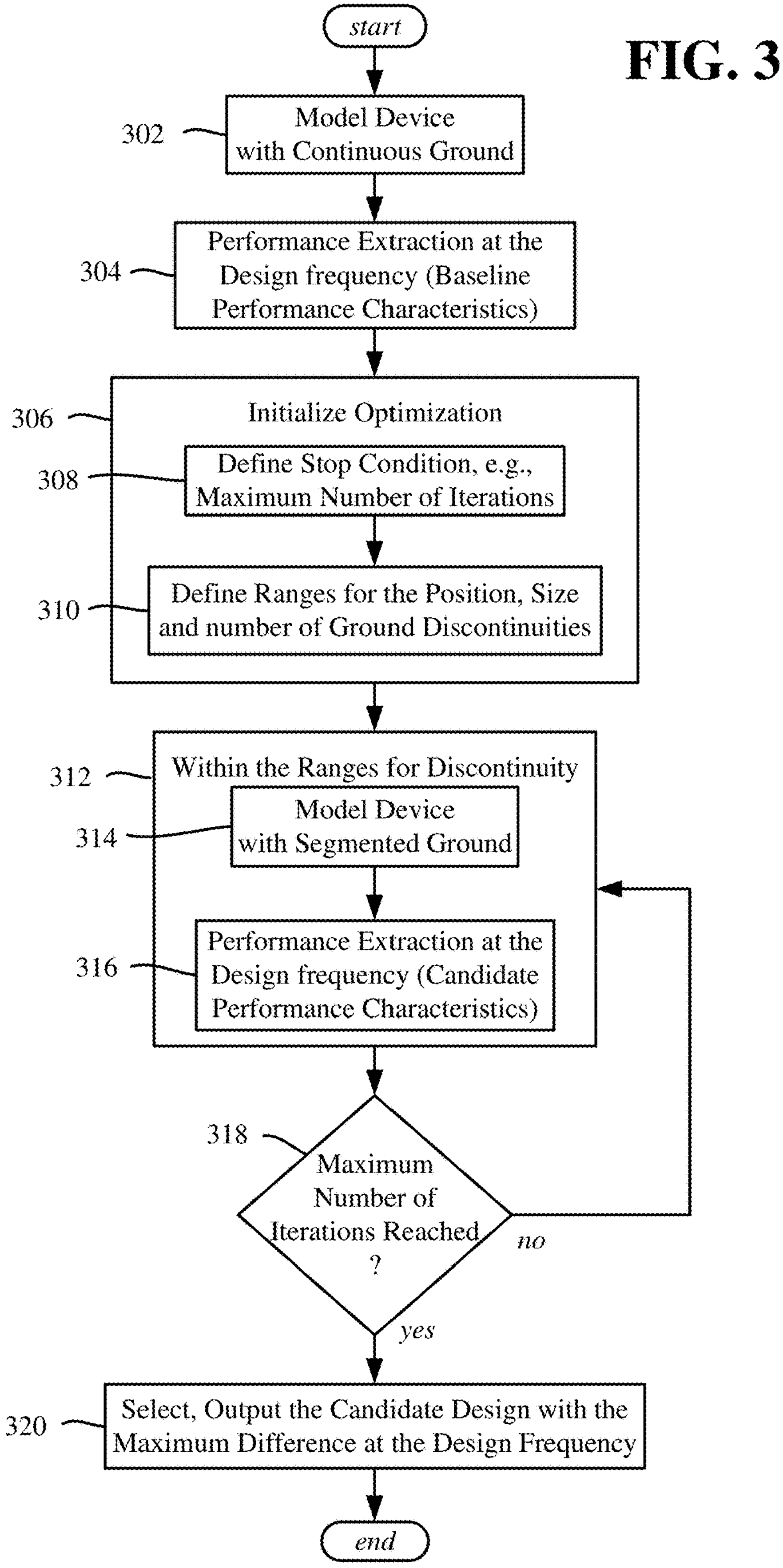
FIG. 3 is a flow diagram showing example operations related to an example optimization process for determining parameters for a metasurface with a segmented ground plane, in accordance with various example embodiments and implementations of the subject disclosure.

FIG. 3 shows the example operations of the optimization process generally performed via the logic 202 of FIG. 2, beginning at operation 302 where the logic models the device with continuous ground. Operation 304 represents the performance extraction at the design frequency to obtain the baseline performance characteristics.

Operation 306 represents initializing the optimization. This can include a user or the like defining the stop condition to the logic at operation 308, e.g., the maximum number of iterations (unless inherently defined by range constraints and deltas as described above). Operation 308 represents defining the range data for obtaining by the process, e.g., for the position, size and/or the number of ground discontinuities.

Operations 312-316 represent, as constrained within the ranges (operation 312), performing the modeling (operation 314) and the performance extraction (operation 316). Operations 314 and 316 are iteratively repeated with different values within the ranges for each iteration, until the maximum number of iterations (or other stopping criterion) is reached at operation 318. When complete, operation 320 selects and outputs the candidate design with the maximum difference (or at least some threshold high difference) at the design frequency.

Figure 4A:
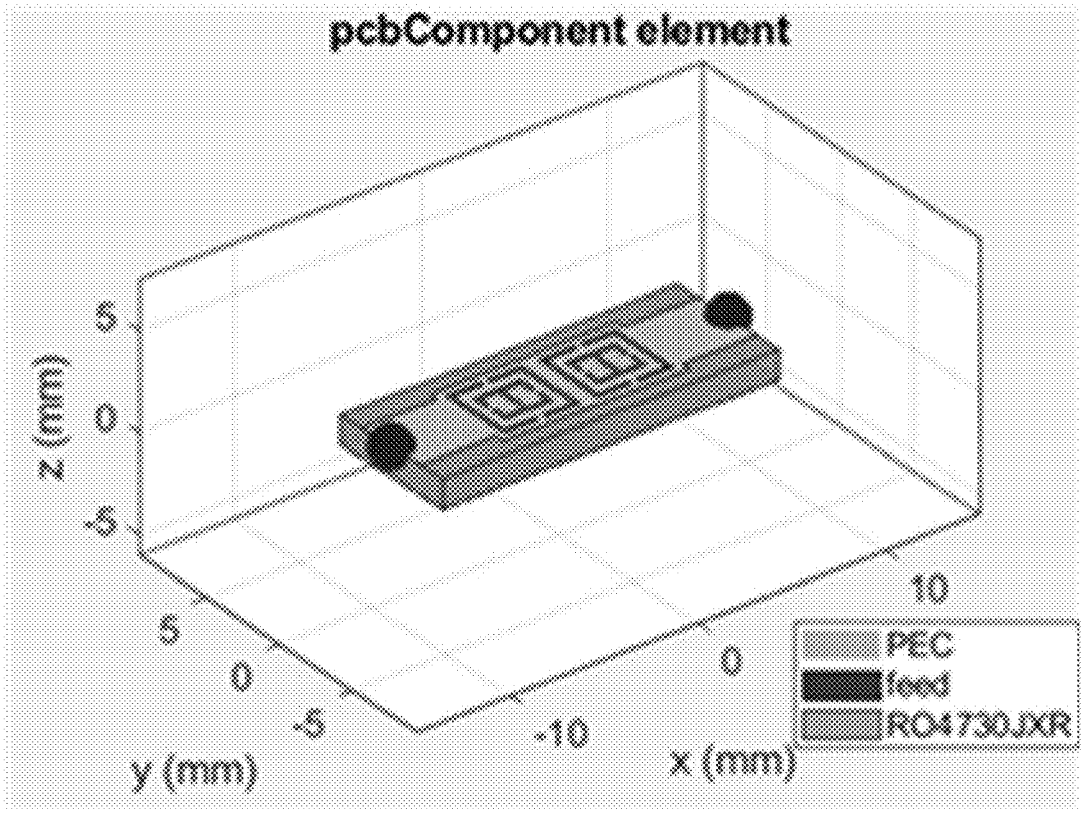
FIG. 4A is a top perspective view representation of an example model baseline structure for a metasurface with a continuous ground plane, in accordance with various example embodiments and implementations of the subject disclosure.
Figure 4B:
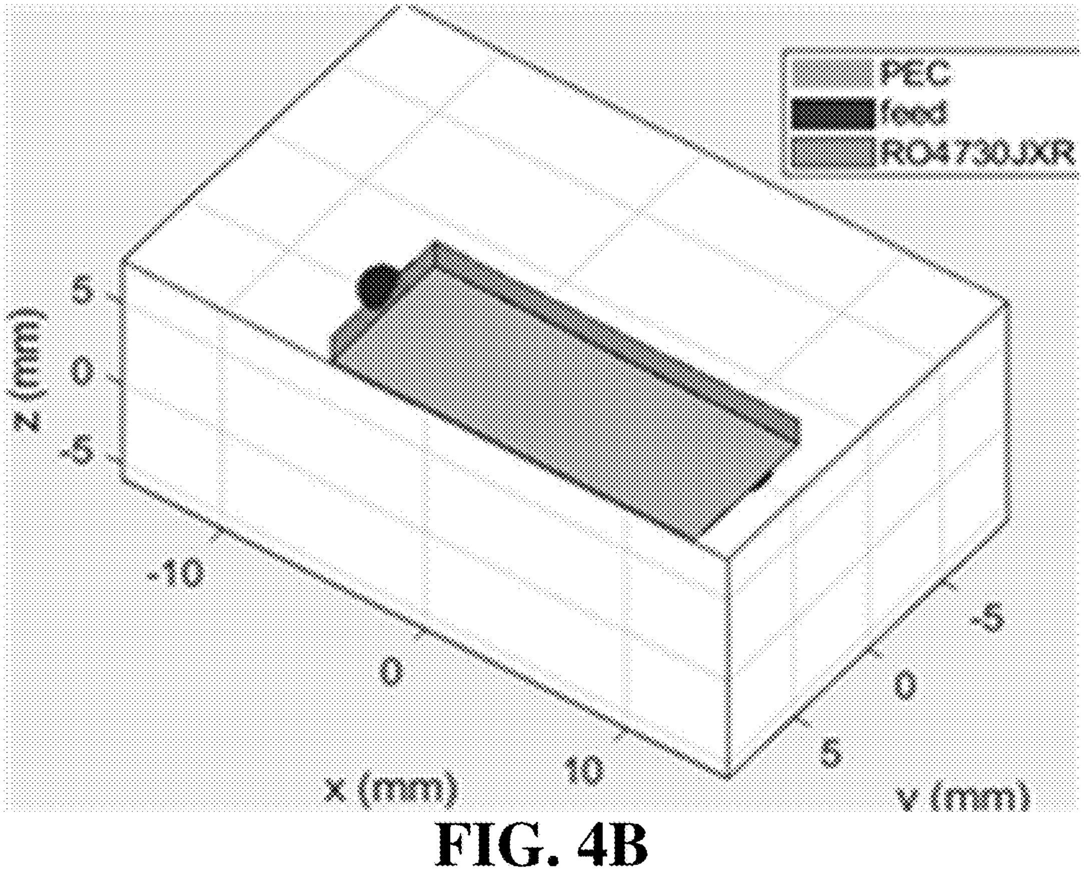
FIG. 4B is a bottom perspective view representation of the example model baseline structure for the metasurface with the continuous ground plane, in accordance with various example embodiments and implementations of the subject disclosure.

Turning to modeling in general, FIGS. 4A and 4B show top and bottom views, respectively, of one model structure for the continuous ground plane device, such as based on the dimensions shown. The model structure for the continuous ground plane corresponds to the activation phase, that is, when the device is worn and contacting skin. Example materials include PEC (perfect electrical conductor, which can be used in modeling), and Rogers RO4730G3 substrate material; a feed is shown at each end.

Figure 5A:
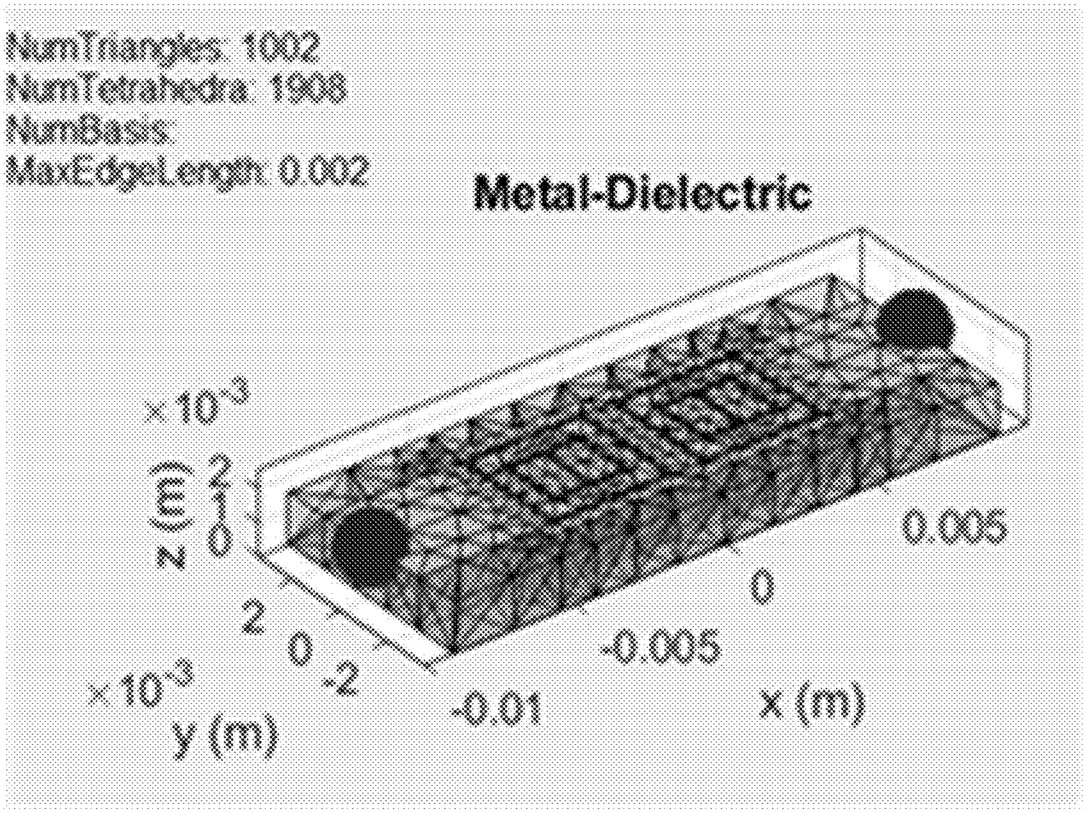
FIG. 5A is a top perspective view representation of meshing the example model baseline structure for the metasurface with the continuous ground plane, in accordance with various example embodiments and implementations of the subject disclosure.
Figure 5B:
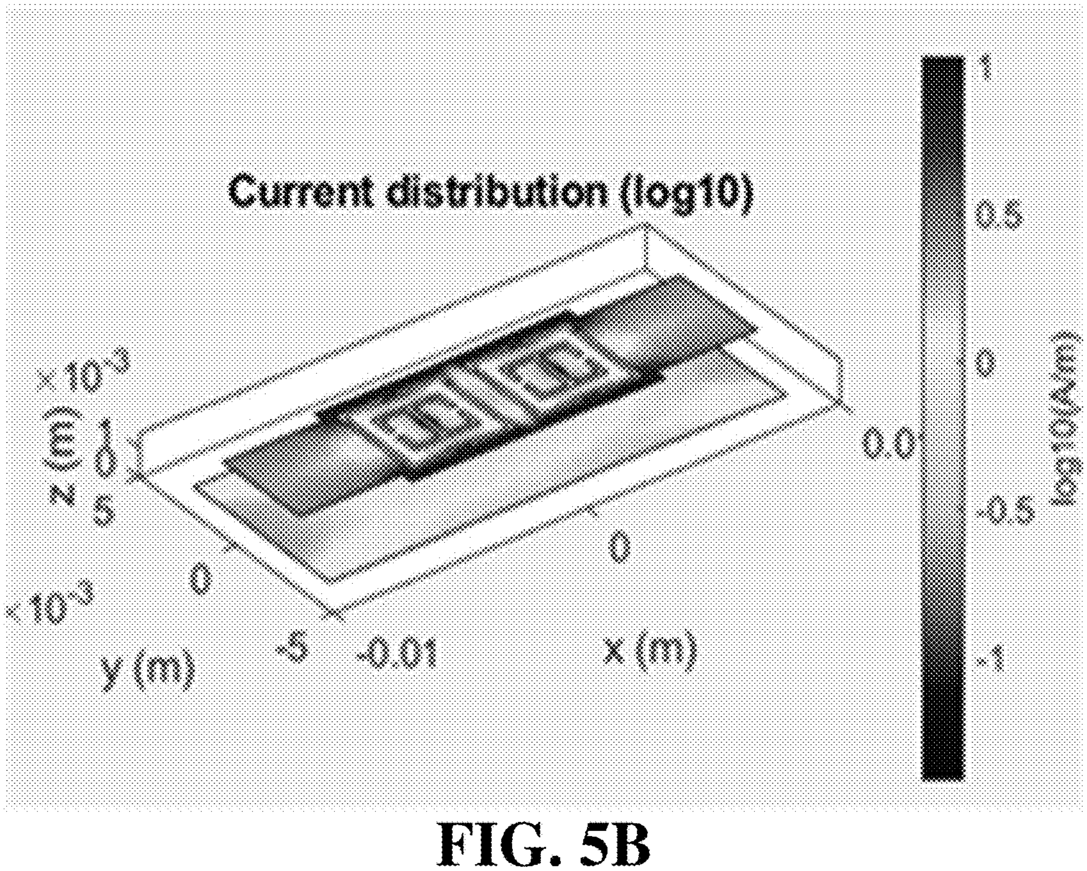
FIG. 5B is a top perspective view representation of current distribution of the example model baseline structure for the metasurface with the continuous ground plane, in accordance with various example embodiments and implementations of the subject disclosure.

FIG. 5A shows the structure of FIGS. 4A and 4B as being meshed, e.g., meticulously modeled within a Finite Element Method (FEM) solver. This model serves as a fundamental benchmarking/baseline device, which remains fixed and acts as a reference aimed at evaluating the maximum discrepancies across various candidate configurations. FIG. 5B illustrates the distinctive current distributions observed within each category of unit-cell aperture; that is, to contextualize this modeling process further, an illustrative current distribution corresponding to the specific design under consideration is shown in FIG. 5B.

Figure 6A:
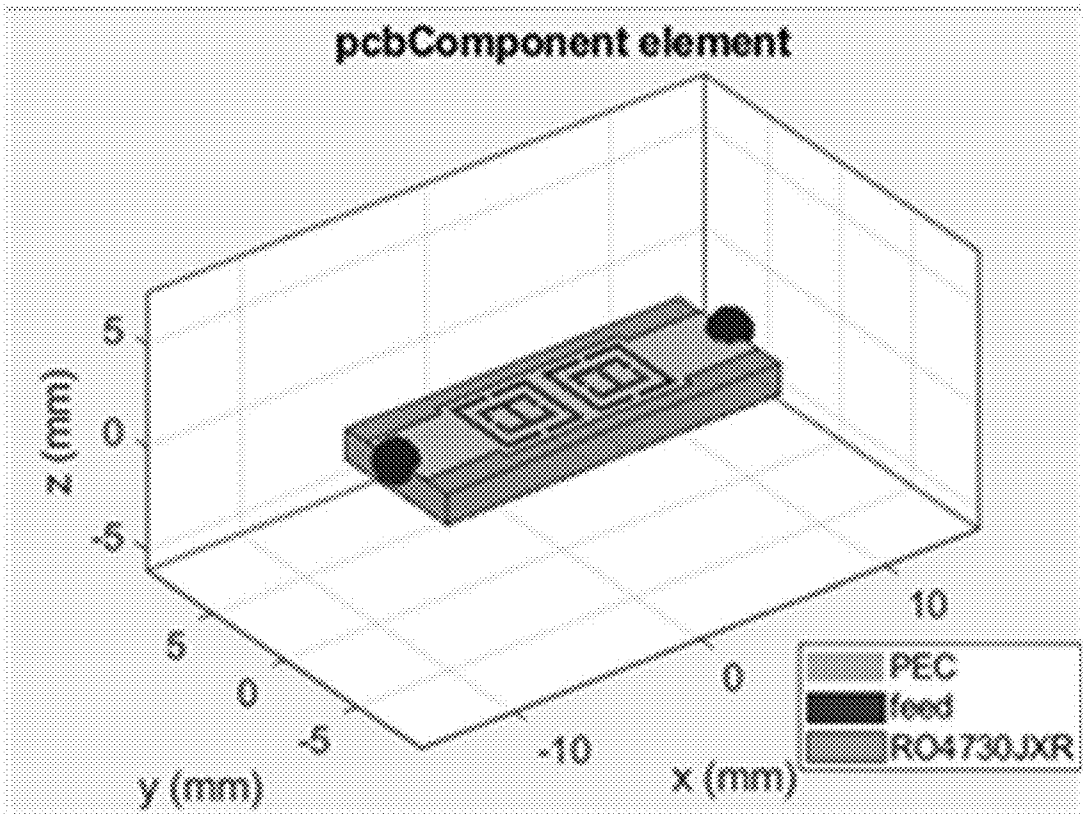
FIG. 6A is a top perspective view representation of an example candidate model structure for a metasurface with a discontinuous (segmented) ground plane, in accordance with various example embodiments and implementations of the subject disclosure, in accordance with various example embodiments and implementations of the subject disclosure.
Figure 6B:
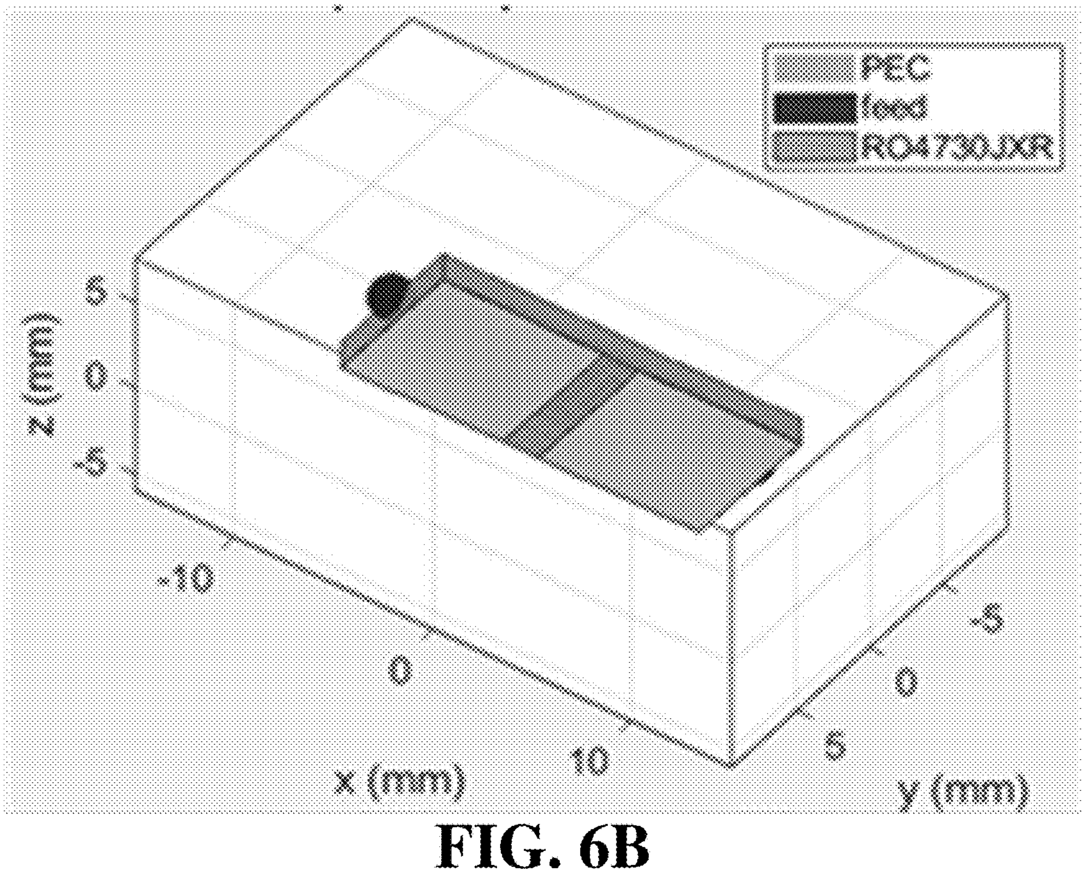
FIG. 6B is a bottom perspective view representation of the example candidate model structure for the metasurface with the discontinuous ground plane, in accordance with various example embodiments and implementations of the subject disclosure, in accordance with various example embodiments and implementations of the subject disclosure.
Figure 7A:
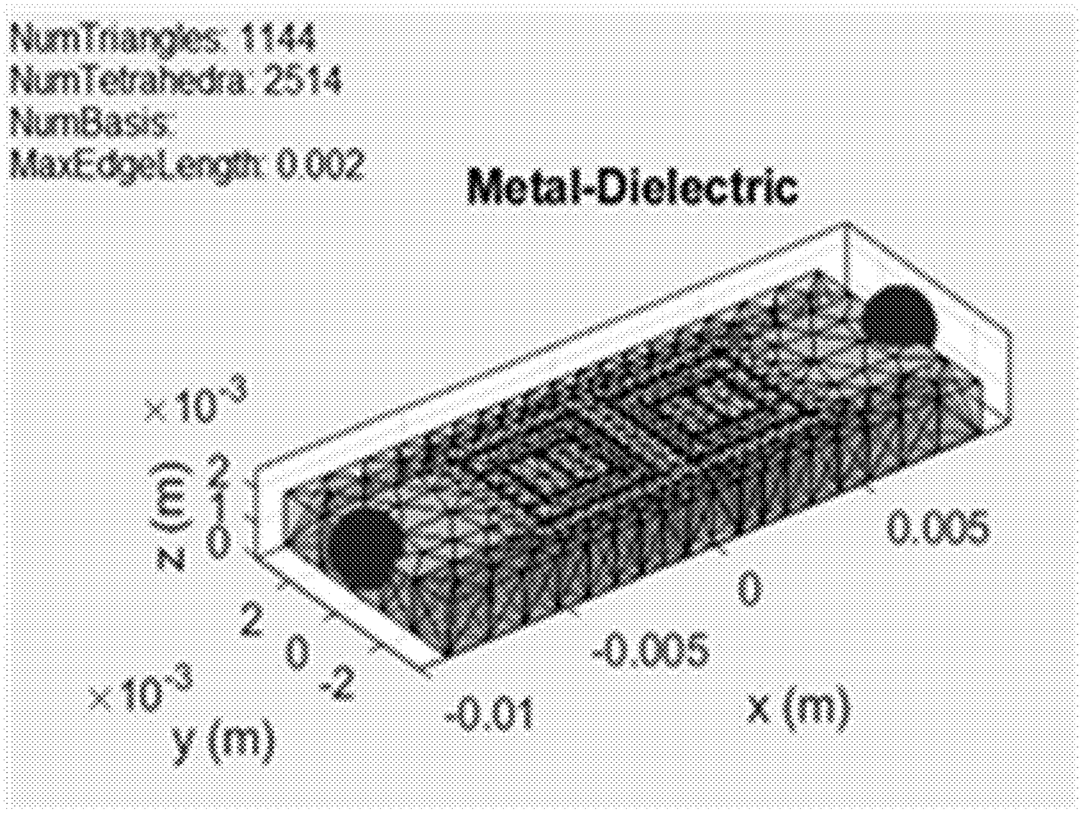
FIG. 7A is a top perspective view representation of meshing the example candidate model structure for the metasurface with the discontinuous ground plane, in accordance with various example embodiments and implementations of the subject disclosure.
Figure 7B:
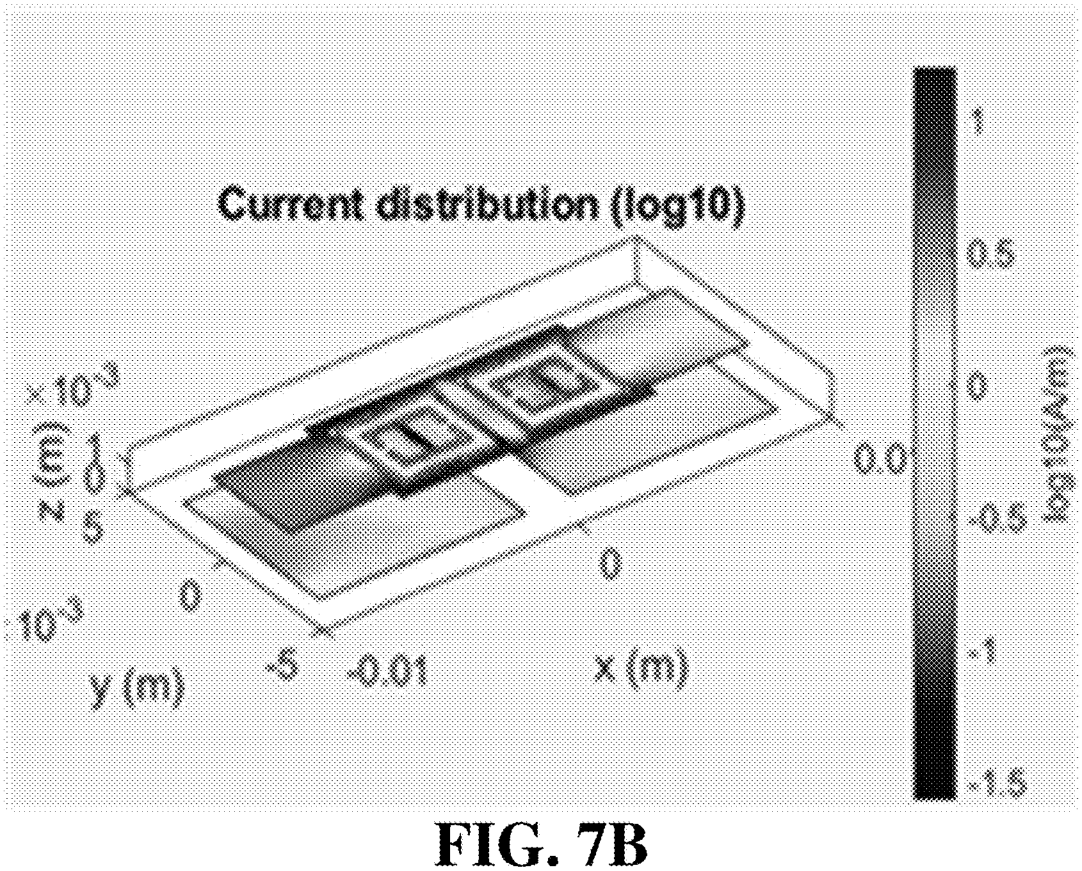
FIG. 7B is a top perspective view representation of current distribution of the example candidate model structure for the metasurface with the discontinuous ground plane, highlighting that the current density is low near the gap in the ground plane, in accordance with various example embodiments and implementations of the subject disclosure.

FIGS. 6A and 6B show one candidate structure for the discontinuous ground plane model, which is meshed as shown in FIG. 7A. This corresponds to the device not being worn, whereby the segments are discontinuous. In each candidate structure, a modification is implemented in the ground plane of the baseline structure, instigating a shift in the current distribution across the ground plane, as depicted in FIG. 5B versus FIG. 7B. This alteration consequently exerts an influence on the transmission and reflection characteristics of the structure, as evidenced in FIGS. 7A and 7B. In other words, the designer provides the input data to vary the geometry of the cut in the ground plane, to find a discontinuous ground plane design that maximizes the difference or optimizes the divergence in the discontinuous ground design. As described with reference to FIGS. 2 and 3, iterative evaluations of the ground plane discontinuity are undertaken to optimize the divergence of the desired structure. Through successive iterations, the impact of each modification is accounted for to extract the configuration that, among the candidates, best aligns with the desired specifications.

Figure 8:
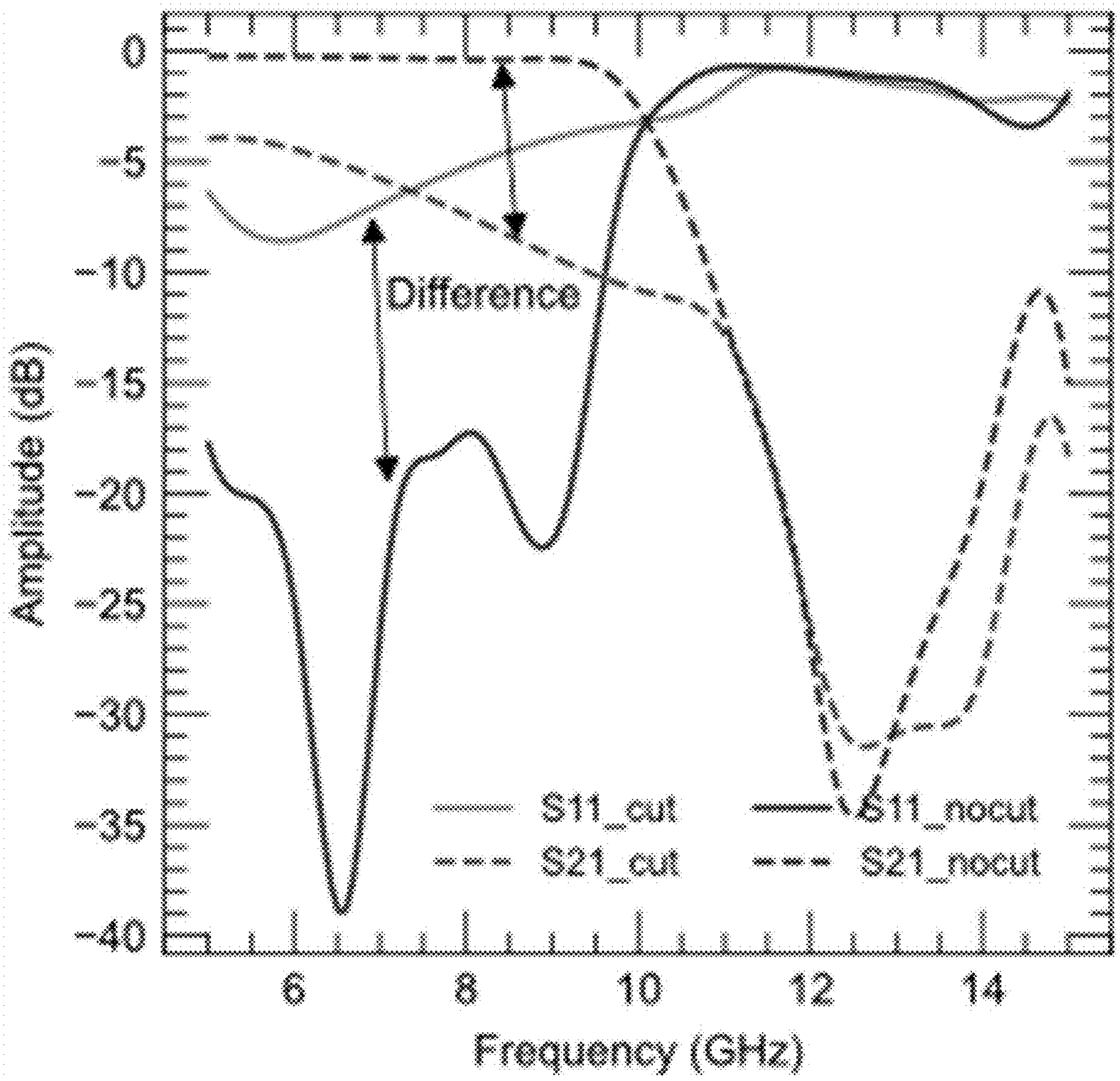
FIG. 8 is a graphical representation of the reflection and transmission characteristics of a baseline model structure without discontinuity in the ground plane and a candidate model structure with a variation of discontinuity in the ground plane, in accordance with various example embodiments and implementations of the subject disclosure.

FIG. 8 is a graphical representation of the reflection and transmission characteristics of the baseline (continuous ground plane) structure and one of the candidate (discontinuous ground plane) structures, with a single variation of discontinuity in ground plane ("cut"), and without ("nocut") the ground plane discontinuity. Due to the periodicity of the unit-cells on the surface, the cells are two-port passive devices, whereby $S_{21}$ can be calculated from $S_{11}$, and vice-versa; maximizing the difference in one will also maximize the difference in the other, as at some level they basically carry the same information.

FIG. 8 serves as a proof-of-concept for using a discontinuous ground plane to create differences in the electromagnetic responses; the frequency in the plot represents a relative value. Note that the frequencies show large differences at times and little to no difference at others (such as around 11.5 GHZ). By varying the geometry of the ground discontinuity, the response changes accordingly to maximize the difference or optimize the divergence. In FIG. 8, the target for maximum difference is 8.5 GHZ (and not 11.5 GHZ); if a difference at 11.5 GHz is desired, the optimization (performance evaluation) focuses on finding a candidate design that maximizes the difference at 11.5 GHZ.

Figure 9B:
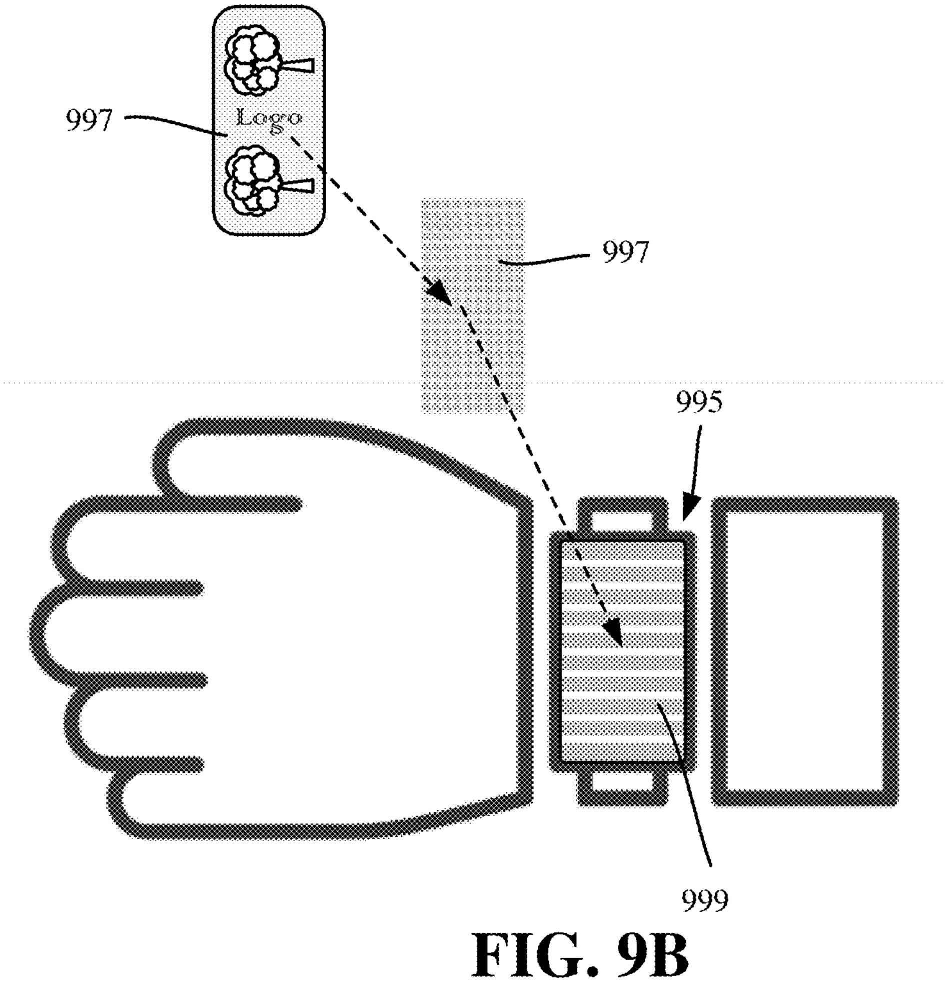
FIG. 9B is a deconstructed representation of an example wearable device with a passive metasurface in the form of a wrist-wearable (e.g., wristband or bracelet) design, in accordance with various example embodiments and implementations of the subject disclosure.

Turning to other considerations, FIG. 9B shows an alternative, non-limiting example of a wearable device, namely designed as a wrist-worn (e.g., wristband or bracelet) device 995. A mask layer 997 and unit cells/metasurface layer 998 are shown separately from the segmented ground plane layer 999 in FIG. 9B for purposes of explanation, but in general are worn as a single-unit wearable device (although detachable/interchangeable masks are feasible). Note that while the metasurface itself is passive, the metasurface can be coupled to a non-passive device, e.g., a watchband of a user's existing battery-powered wristwatch. Some example consideration factors when choosing among the wearable metasurface devices are summarized in the following table:

| User Needs | Product |
|---|---|
| Tranceiver Alignment | Ring |
| Gain | Wrist-worn Device |

Figure 10A:
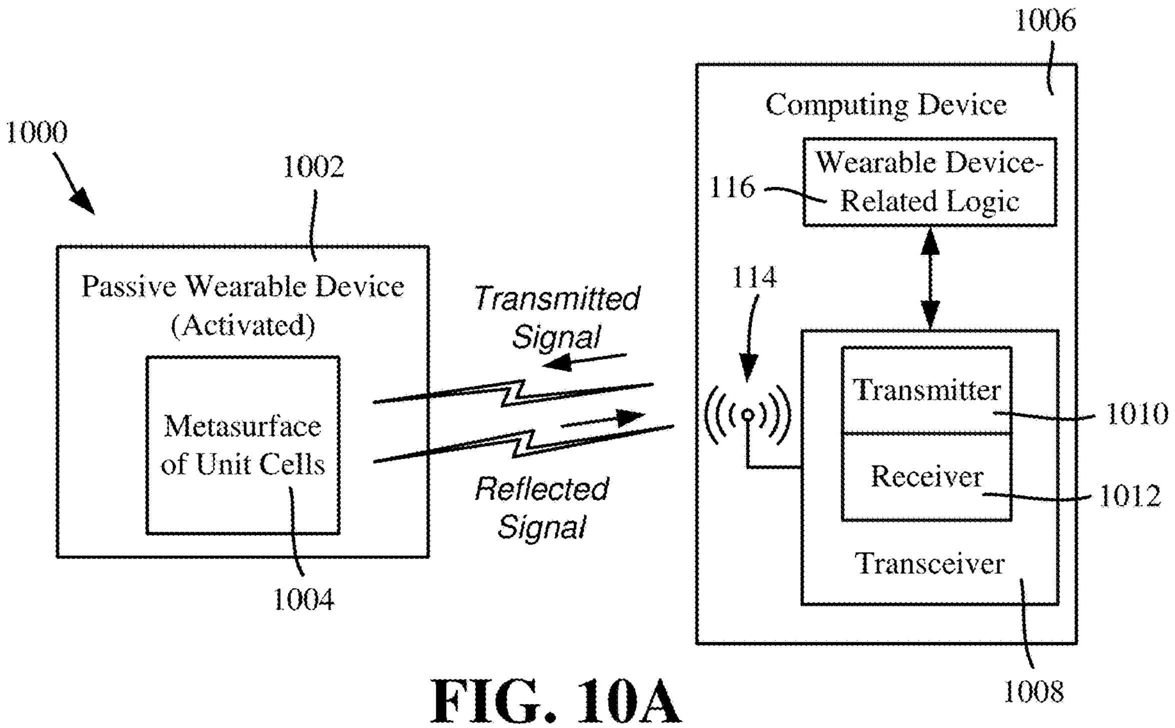
FIG. 10A is a block diagram representation of an example wearable device including an activated, passive metasurface communicating with a computing device via an embedded transceiver, in accordance with various example embodiments and implementations of the subject disclosure.

FIG. 10A is a block diagram representation of one example implementation of a system 1000 in which a wearable device 1002, which includes a metasurface of unit cells 1004, communicates with a computing device 1006. In the example of FIG. 10A, the computing device 1006 includes an embedded, integrated or otherwise internal transceiver 1008, which in turn includes a transmitter 1010 and receiver 1012. The transceiver components are coupled to an antenna 1014 that transmits signals to the metasurface 1004 of the passive wearable device 1002, which as described herein, alters a reflected instance of the signal's characteristics to the transceiver's receiver 1012. Based on the received signal, wearable device-related logic 1016 (e.g., a hardware or software program running in the computing device 1006) can analyze the reflected signal and take some action based thereon as described herein, such as to wake the operating system program or the like for execution in the computing device.

Figure 10B:
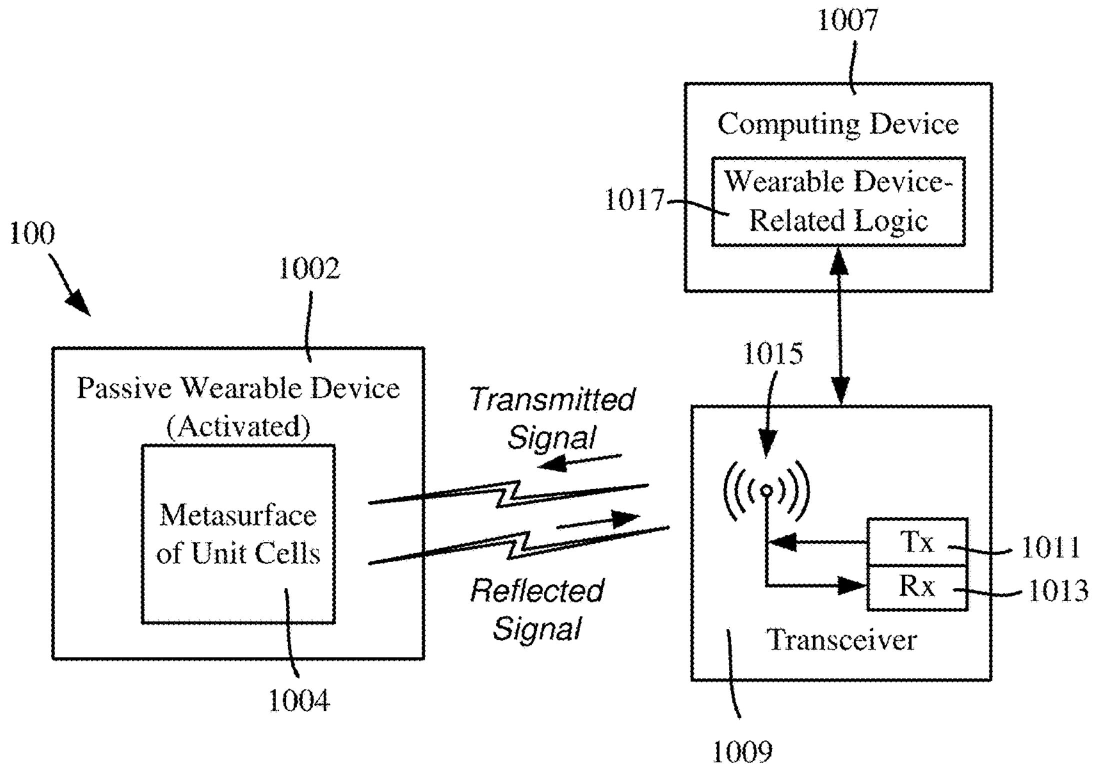
FIG. 10B is a block diagram representation of an example wearable device including an activated, passive metasurface communicating with a computing device via an external transceiver, in accordance with various example embodiments and implementations of the subject disclosure.

FIG. 10B is similar to FIG. 10A, except that a transceiver 1009 (transmitter Tx 1011/receiver Rx 1013) is external to the computing device 1007. For example, the external transceiver 1009 can be designed as a universal serial bus (USB) device or other suitable device that plugs into a port of the computing device 1009.

While a dedicated transceiver is one practical and convenient example, it should be noted that the transmitter and the receiver can be separate components. For example, consider an office setting where a single wall-mounted transmitter can transmit signals to multiple user work locations. Each user can share the same transmitter, yet have his or her own passive wearable device that reflects from the transmitter to a receiver. The users' respective computing devices can have respective external or internal receivers.

Figure 11:
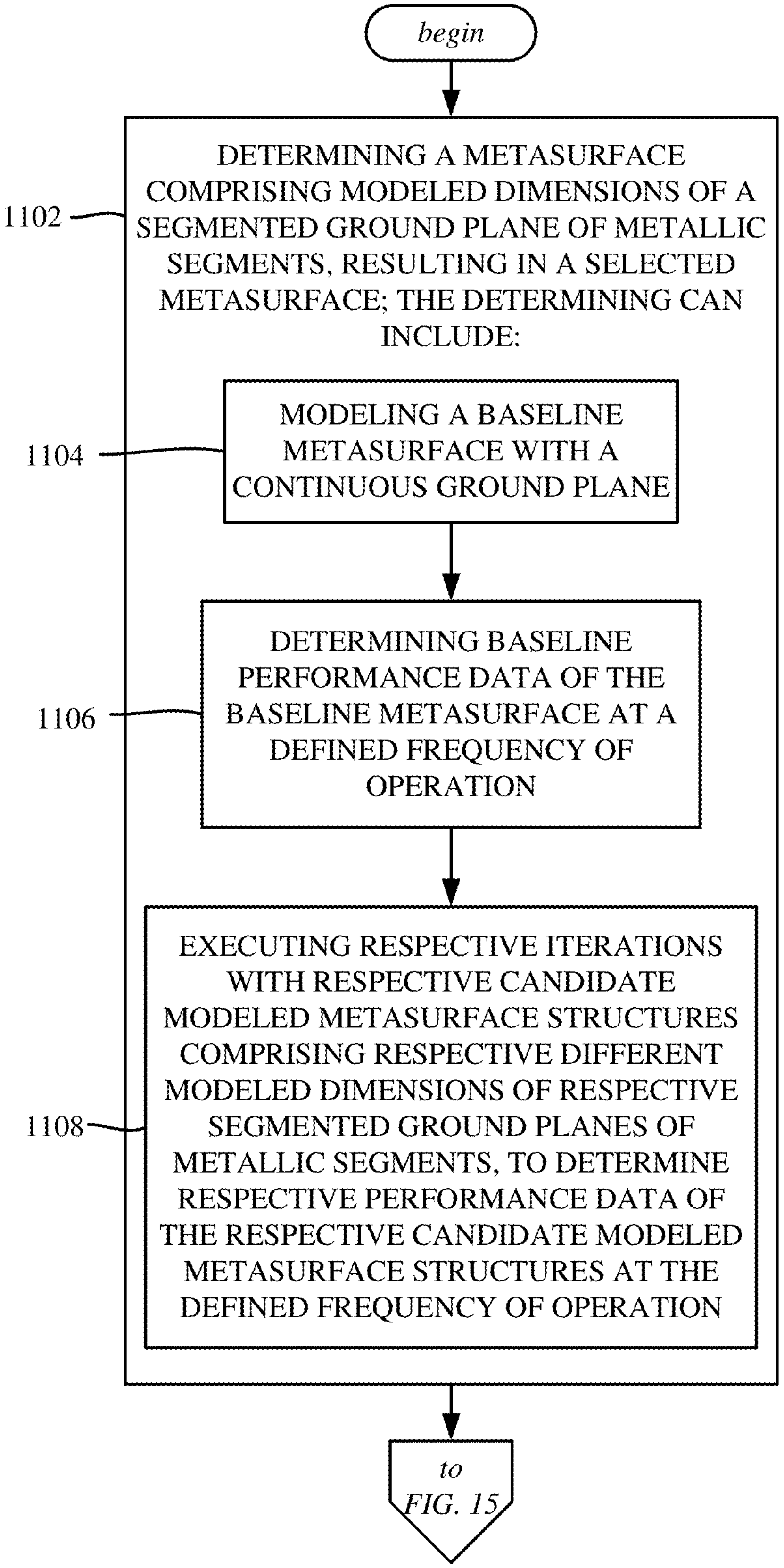
FIGS. 11 and 12 comprise a flow diagram showing example operations related to iteratively determining which candidate modeled metasurface has at least a threshold large performance data difference based on a model with baseline performance data, in accordance with various example embodiments and implementations of the subject disclosure.
Figure 12:
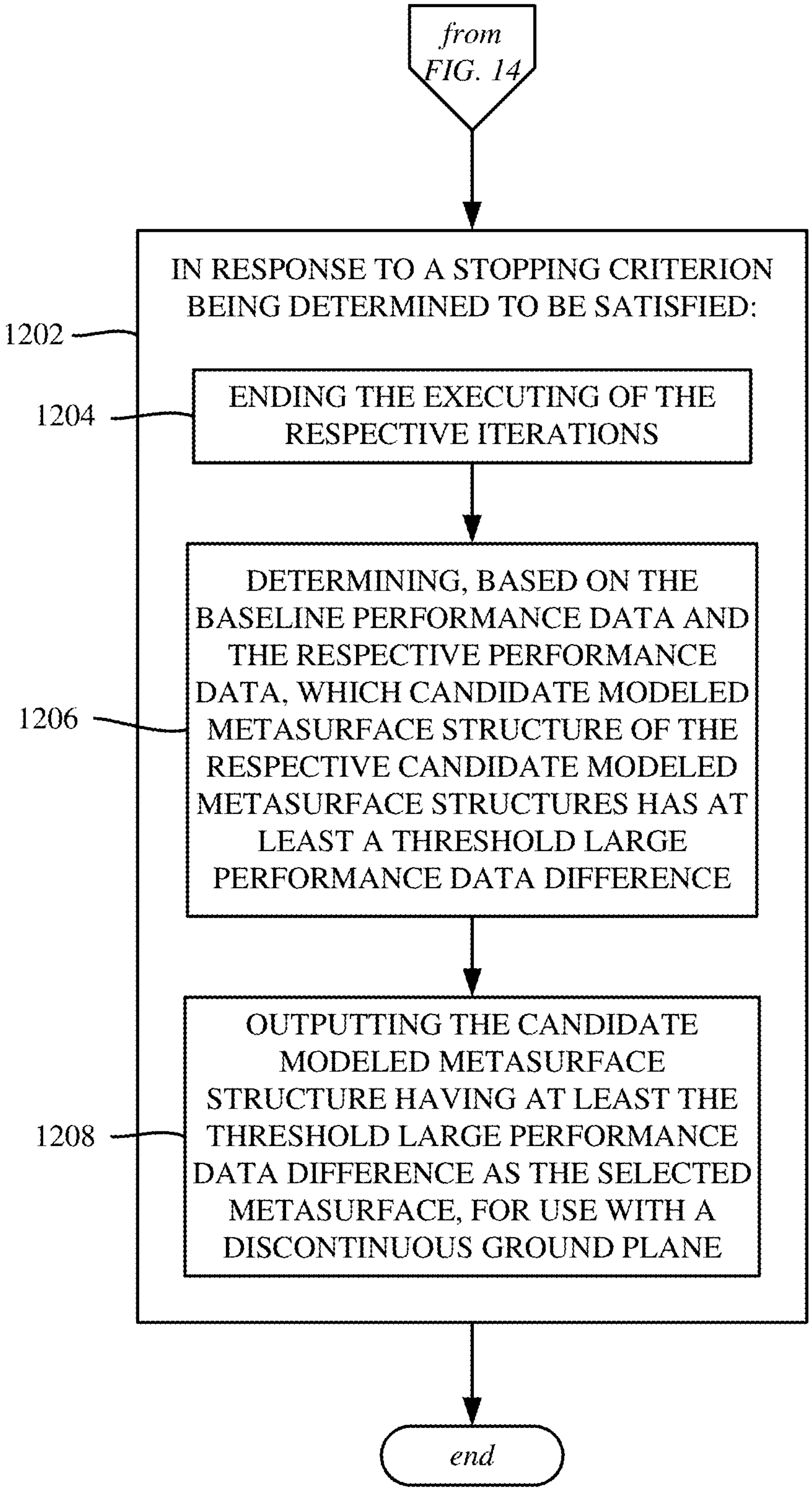

One or more aspects can be embodied in a system, such as represented in the example operations of FIGS. 11 and 12, and for example can include a memory that stores computer executable components and/or operations, and a processor that executes computer executable components and/or operations stored in the memory. Example operations can include operation 702, which represents determining a metasurface comprising modeled dimensions of a segmented ground plane of metallic segments, resulting in a selected metasurface. The determining can include operations 1104, 1106 and 1108. Example operation 1104 represents modeling a baseline metasurface with a continuous ground plane. Example operation 1106 represents determining baseline performance data of the baseline metasurface at a defined frequency of operation. Example operation 1108 represents executing respective iterations with respective candidate modeled metasurface structures comprising respective different modeled dimensions of respective segmented ground planes of metallic segments, to determine respective performance data of the respective candidate modeled metasurface structures at the defined frequency of operation. The operations continue at FIG. 12, in which example operation 1202 represents, in response to a stopping criterion being determined to be satisfied, performing operations 1204, 1206 and 1208. Example operation 1204 represents ending the executing of the respective iterations. Example operation 1206 represents determining, based on the baseline performance data and the respective performance data, which candidate modeled metasurface structure of the respective candidate modeled metasurface structures has at least a threshold large performance data difference. Example operation 1208 represents outputting the candidate modeled metasurface structure having at least the threshold large performance data difference as the selected metasurface, for use with a discontinuous ground plane.

The respective different segment dimensions can be within a defined segment dimensions range.

The respective different modeled dimensions can include respective different modeled size data, respective different modeled position data, and respective different modeled quantities of ground discontinuities based on adjacent segments of the candidate metasurfaces.

The respective different modeled dimensions can include respective different ground discontinuity size data between adjacent segments. Size values of the respective different ground discontinuity size data can be within a defined size data range.

The respective different modeled dimensions can include respective different ground discontinuity position data between adjacent segments. Size values of the respective different ground discontinuity size data can be within a defined position data range.

The different modeled dimensions can include respective different quantity data of ground discontinuities between adjacent segments. Quantity values of the respective different quantity data can be within a defined quantity data range.

The stopping criterion can include a defined number of the respective iterations.

The respective performance data can include respective transmission characteristics data of the modeled structure.

The respective performance data can include respective reflection characteristics data of the modeled structure.

Figure 13:
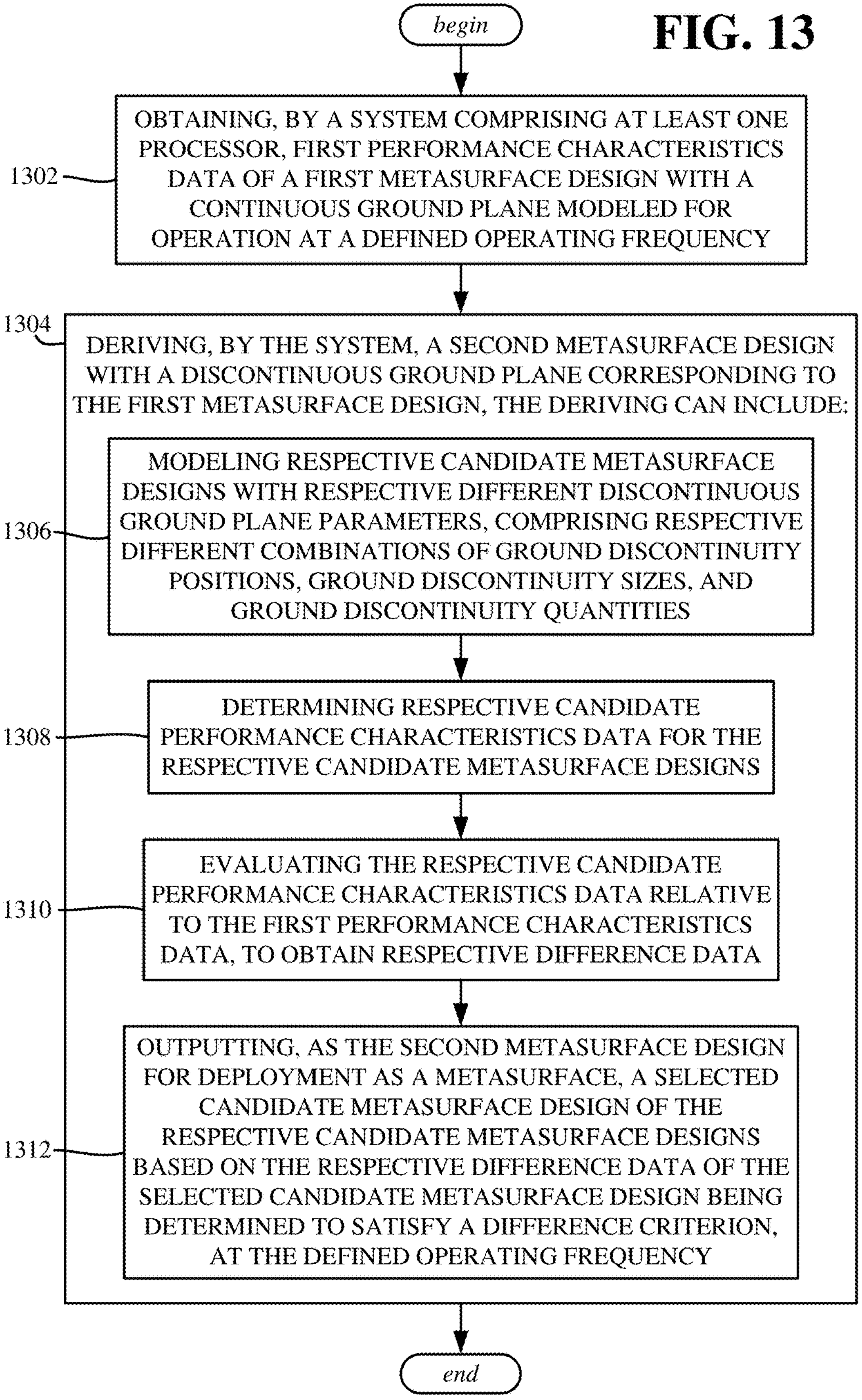
FIG. 13 is a flow diagram showing example operations related to deriving a metasurface design with a discontinuous ground plane based on evaluating candidate performance characteristics data relative to performance characteristics data of a metasurface design with a continuous ground plane, in accordance with various example embodiments and implementations of the subject disclosure.

One or more example aspects, such as corresponding to example operations of a method, are represented in FIG. 13. Example operation 1302 represents obtaining, by a system comprising at least one processor, first performance characteristics data of a first metasurface design with a continuous ground plane modeled for operation at a defined operating frequency;

Example operation 1304 represents deriving, by the system, a second metasurface design with a discontinuous ground plane corresponding to the first metasurface design. The deriving can include operations 1306-1312. Example operation 1306 represents modeling respective candidate metasurface designs with respective different discontinuous ground plane parameters, comprising respective different combinations of ground discontinuity positions, ground discontinuity sizes, and ground discontinuity quantities. Example operation 1308 represents determining respective candidate performance characteristics data for the respective candidate metasurface designs. Example operation 1310 represents evaluating the respective candidate performance characteristics data relative to the first performance characteristics data, to obtain respective difference data. Example operation 1312 represents outputting, as the second metasurface design for deployment as a metasurface, a selected candidate metasurface design of the respective candidate metasurface designs based on the respective difference data of the selected candidate metasurface design being determined to satisfy a difference criterion, at the defined operating frequency.

The difference criterion can correspond to which candidate metasurface design of the respective candidate metasurface designs has a greatest difference of the respective difference data.

Modeling the respective candidate metasurface designs can include iterating over a group of the respective candidate metasurface designs with the respective different discontinuous ground plane parameters.

The respective different combinations of the ground discontinuity positions, the ground discontinuity sizes, and the ground discontinuity quantities can be constrained within a defined ground discontinuity positions range, a defined ground discontinuity sizes range, and a ground discontinuity quantities range, respectively.

Figure 14:
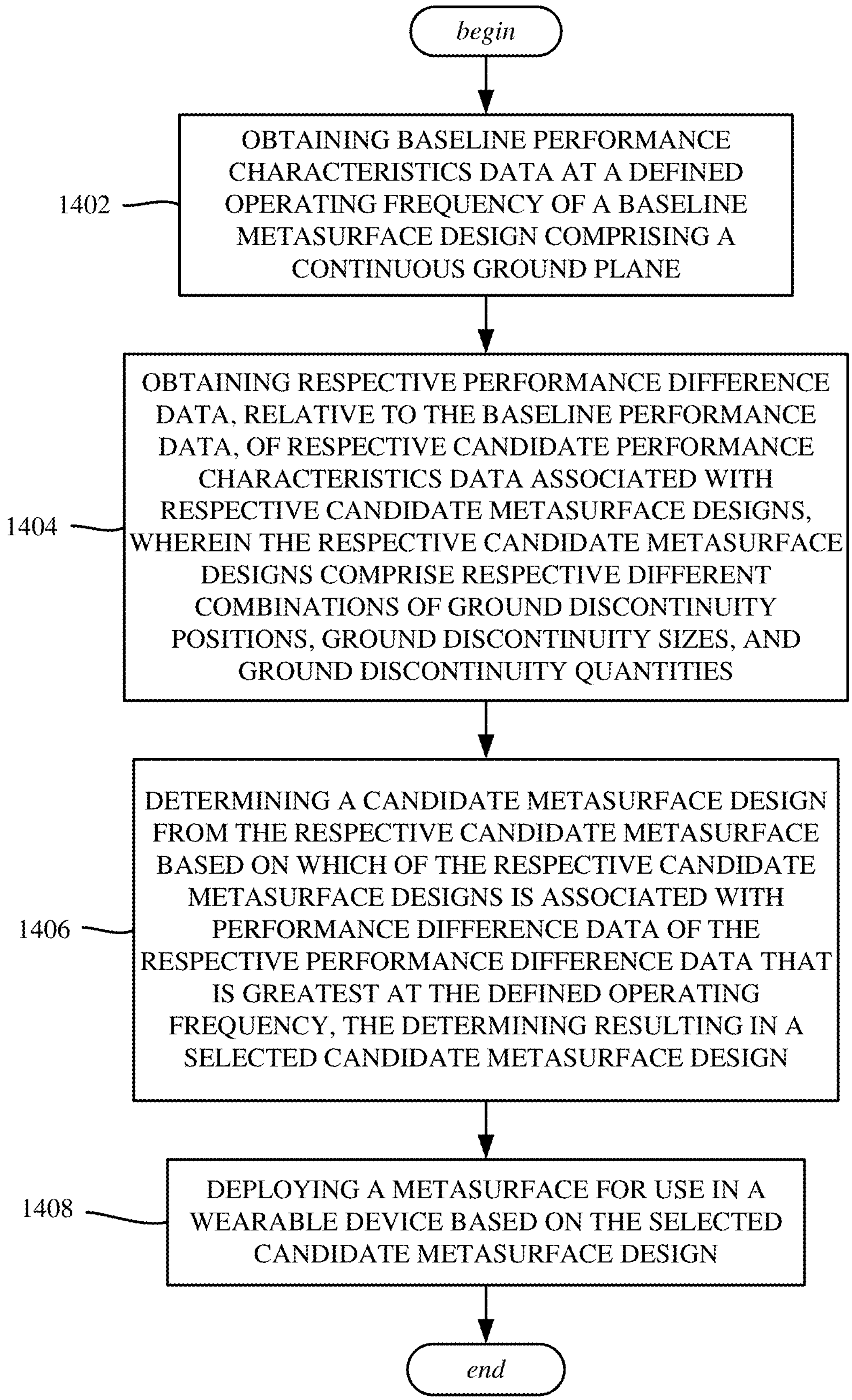
FIG. 14 is a flow diagram showing example operations related to deploying a metasurface for use in a wearable device based on performance difference data relative to baseline performance data, in accordance with various example embodiments and implementations of the subject disclosure.

FIG. 14 summarizes various example operations, e.g., corresponding to a machine-readable medium, comprising executable instructions that, when executed by a processor, facilitate performance of operations. Example operation 1402 represents obtaining baseline performance characteristics data at a defined operating frequency of a baseline metasurface design comprising a continuous ground plane. Example operation 1404 obtaining respective performance difference data, relative to the baseline performance data, of respective candidate performance characteristics data associated with respective candidate metasurface designs, wherein the respective candidate metasurface designs can include respective different combinations of ground discontinuity positions, ground discontinuity sizes, and ground discontinuity quantities. Example operation 1406 determining a candidate metasurface design from the respective candidate metasurface based on which of the respective candidate metasurface designs is associated with performance difference data of the respective performance difference data that is greatest at the defined operating frequency, the determining resulting in a selected candidate metasurface design. Example operation 1408 deploying a metasurface for use in a wearable device based on the selected candidate metasurface design.

The respective candidate performance characteristics data can include respective transmission characteristics data and respective reflection characteristics data of the modeled structure.

Obtaining the respective performance difference data can include iterating over the respective different combinations of ground discontinuity positions, ground discontinuity sizes, and ground discontinuity quantities for a defined number of iterations.

The respective different combinations of the ground discontinuity positions, the ground discontinuity sizes, and the ground discontinuity quantities can be constrained within a defined ground discontinuity positions range, a defined ground discontinuity sizes range, and a ground discontinuity quantities range, respectively.

As can be seen, the technology described herein is directed to designing and deploying activatable and deactivatable wearable devices with metasurfaces designed with a distinct physical radiation pattern/signature that facilitates detection of the device when activated. An iterative optimization process can be used to find a metasurface design with a segmented ground plane that has a largest difference between the activated and deactivated states. Activation and deactivation are based on the segmented ground plane that is part of the metasurface design. When activated, e.g., when the device is worn by a user which completes the ground plane by coupling the separated segments together via skin conductivity, the wearable/portable devices can be detected, such as for proximity detection and/or seamless authentication on digital computing devices such as a laptop/desktop PC. When not worn, the device is deactivated as a result of the ground plane segments being electrically separated from one another. The technology described herein is thus implemented through a passive metasurface, to enhance personal security and facilitate seamless interaction with digital environments. Metasurfaces, being engineered interfaces, manipulate electromagnetic waves in ways that traditional materials cannot, without requiring any power source, making them very suitable for passive operations in wearable technology, as well as facilitating distinct radiation patterns per metasurface.

The above description of illustrated embodiments of the subject disclosure, comprising what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:

at least one processor; and at least one memory that stores executable instructions that, when executed by the at least one processor, facilitate performance of operations, the operations comprising:

determining a metasurface comprising modeled dimensions of a segmented ground plane of metallic segments, resulting in a selected metasurface, the determining comprising:

modeling a baseline metasurface with a continuous ground plane;

determining baseline performance data of the baseline metasurface at a defined frequency of operation;

executing respective iterations with respective candidate modeled metasurface structures comprising respective different modeled dimensions of respective segmented ground planes of metallic segments, to determine respective performance data of the respective candidate modeled metasurface structures at the defined frequency of operation; and in response to a stopping criterion being determined to be satisfied:

ending the executing of the respective iterations, determining, based on the baseline performance data and the respective performance data, which candidate modeled metasurface structure of the respective candidate modeled metasurface structures has at least a threshold large performance data difference, and outputting the candidate modeled metasurface structure having at least the threshold large performance data difference as the selected metasurface, for use with a discontinuous ground plane.

2. The system of claim 1, wherein the respective different segment dimensions are within a defined segment dimensions range.

3. The system of claim 1, wherein the respective different modeled dimensions comprise respective different modeled size data, respective different modeled position data, and respective different modeled quantities of ground discontinuities based on adjacent segments of the candidate metasurfaces.

4. The system of claim 1, wherein the respective different modeled dimensions comprise respective different ground discontinuity size data between adjacent segments.

5. The system of claim 4, wherein size values of the respective different ground discontinuity size data are within a defined size data range.

6. The system of claim 1, wherein the respective different modeled dimensions comprise respective different ground discontinuity position data between adjacent segments.

7. The system of claim 6, wherein size values of the respective different ground discontinuity size data are within a defined position data range.

8. The system of claim 1, wherein the different modeled dimensions comprise respective different quantity data of ground discontinuities between adjacent segments.

9. The system of claim 8, wherein quantity values of the respective different quantity data are within a defined quantity data range.

10. The system of claim 1, wherein the stopping criterion comprises a defined number of the respective iterations.

11. The system of claim 1, wherein the respective performance data comprises respective transmission characteristics data of the modeled structure.

12. The system of claim 1, wherein the respective performance data comprises respective reflection characteristics data of the modeled structure.

13. A method, comprising:

obtaining, by a system comprising at least one processor, first performance characteristics data of a first metasurface design with a continuous ground plane modeled for operation at a defined operating frequency;

deriving, by the system, a second metasurface design with a discontinuous ground plane corresponding to the first metasurface design, the deriving comprising:

modeling respective candidate metasurface designs with respective different discontinuous ground plane parameters, comprising respective different combinations of ground discontinuity positions, ground discontinuity sizes, and ground discontinuity quantities;

determining respective candidate performance characteristics data for the respective candidate metasurface designs;

evaluating the respective candidate performance characteristics data relative to the first performance characteristics data, to obtain respective difference data; and outputting, as the second metasurface design for deployment as a metasurface, a selected candidate metasurface design of the respective candidate metasurface designs based on the respective difference data of the selected candidate metasurface design being determined to satisfy a difference criterion, at the defined operating frequency.

14. The method of claim 13, wherein the difference criterion corresponds to which candidate metasurface design of the respective candidate metasurface designs has a greatest difference of the respective difference data.

15. The method of claim 13, wherein the modeling of the respective candidate metasurface designs comprises iterating over a group of the respective candidate metasurface designs with the respective different discontinuous ground plane parameters.

16. The method of claim 13, wherein the respective different combinations of the ground discontinuity positions, the ground discontinuity sizes, and the ground discontinuity quantities are constrained within a defined ground discontinuity positions range, a defined ground discontinuity sizes range, and a ground discontinuity quantities range, respectively.

17. A non-transitory machine-readable medium, comprising executable instructions that, when executed by at least one processor, facilitate performance of operations, the operations comprising:

obtaining baseline performance characteristics data at a defined operating frequency of a baseline metasurface design comprising a continuous ground plane;

obtaining respective performance difference data, relative to the baseline performance data, of respective candidate performance characteristics data associated with respective candidate metasurface designs, wherein the respective candidate metasurface designs comprise respective different combinations of ground discontinuity positions, ground discontinuity sizes, and ground discontinuity quantities;

determining a candidate metasurface design from the respective candidate metasurface based on which of the respective candidate metasurface designs is associated with performance difference data of the respective performance difference data that is greatest at the defined operating frequency, the determining resulting in a selected candidate metasurface design; and deploying a metasurface for use in a wearable device based on the selected candidate metasurface design.

18. The non-transitory machine-readable medium of claim 17, wherein the respective candidate performance characteristics data comprises respective transmission characteristics data and respective reflection characteristics data of the modeled structure.

19. The non-transitory machine-readable medium of claim 17, wherein the obtaining of the respective performance difference data comprises iterating over the respective different combinations of ground discontinuity positions, ground discontinuity sizes, and ground discontinuity quantities for a defined number of iterations.

20. The non-transitory machine-readable medium of claim 17, wherein the respective different combinations of the ground discontinuity positions, the ground discontinuity sizes, and the ground discontinuity quantities are constrained within a defined ground discontinuity positions range, a defined ground discontinuity sizes range, and a ground discontinuity quantities range, respectively.

* * * * *